March 14, 1950 R. A. CHRISTIAN ET AL 2,500,346
CLUTCH CONTROL MECHANISM FOR CALCULATING MACHINES
Filed July 10, 1947 2 Sheets-Sheet 1

Inventors
RAYMOND A. CHRISTIAN
& WILLIAM L. PADEN
BY Earl Beust
THEIR Attorney

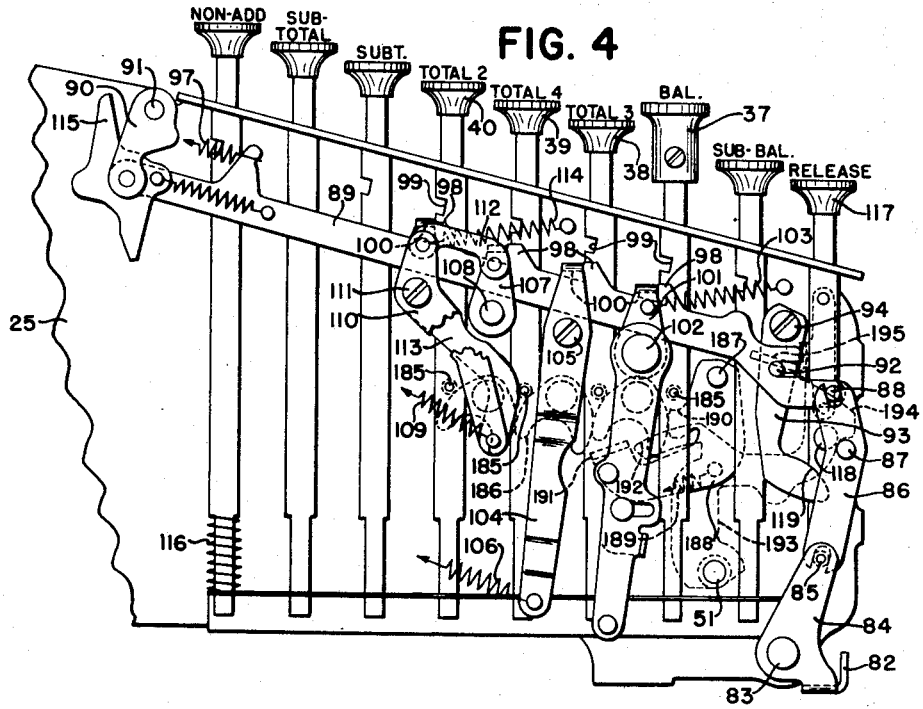
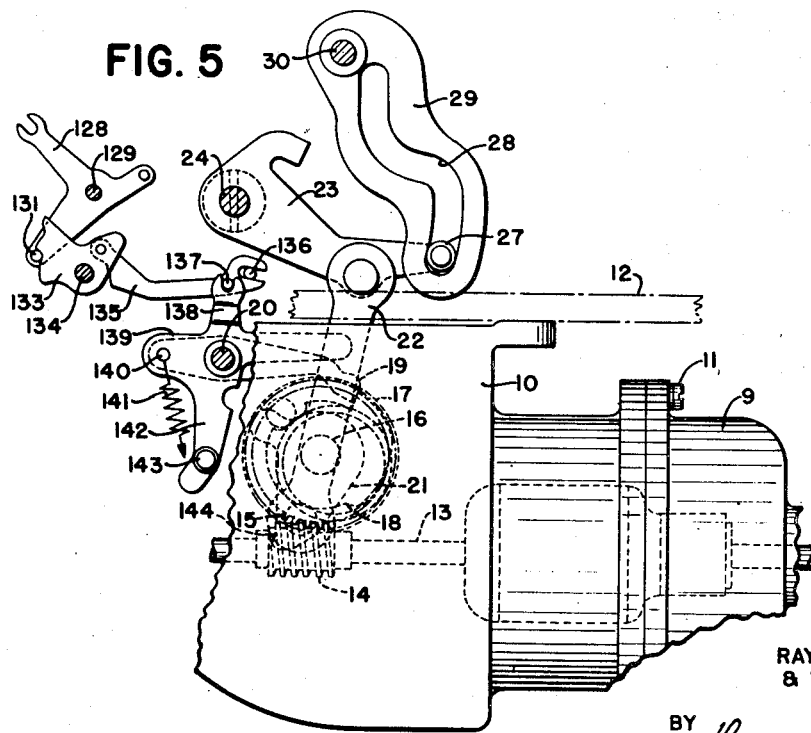

Patented Mar. 14, 1950

2,500,346

UNITED STATES PATENT OFFICE 2,500,346

CLUTCH CONTROL MECHANISM FOR CALCULATING MACHINES

Raymond A. Christian, Oakwood, and William L. Paden, Dayton, Ohio, assignors to National Cash Register Company, Dayton, Ohio, a corporation of Maryland Application July 10, 1947, Serial No. 760,078

11 Claims. (Cl. 192—22)

This invention relates to an improved clutch control mechanism for calculating machines, and more particularly to a mechanism for controlling the operation of a power-actuated device for engaging the motor clutch of a calculating machine.

Heretofore it has been customary in the calculating machine art to provide a direct linkage from the motor bars or other manipulative members to the main clutch of the machine, so that depression of the bars or other members will cause the linkage to be actuated and thereby cause the clutch to be engaged and the machine to be operated. However, as additional refinements have been made in these machines and more functions have been incorporated therein, the clutch control linkages have tended to become more involved and more complex, so that the load imposed upon the motor bars and other motorized manipulative members has become quite heavy and the force required to depress these devices is consequently considerably greater than that which is essential for convenient and rapid operation of the machine.

Accordingly, it is an object of the present invention to provide, in a motor-driven business machine, a power means for actuating the clutch control linkage of the machine under the control of a motor bar or other manipulative member, thereby relieving the operator of the machine of the effort of operating the linkage.

Another object of the invention is to provide, in a power-operated business machine, a power-operated clutch-engaging mechanism which is operable under the control of a manipulative member to give the machine a cycle of operation but which will not cause repeated cycling of the machine if the manipulative member is held depressed.

A further object of the invention is to provide a power-operated clutch-engaging mechanism for calculating machines which may be rendered operable by any one of a plurality of manipulative members and which may also be blocked by a selectively operable locking means, together with means for causing certain of said manipulative members to be blocked by said locking means.

Still a further object of the invention is to provide means for restoring the power-operated clutch-engaging mechanism of a calculating machine to its initial position after it has been rendered operable by a manipulative member and then blocked by a selectively operable locking means.

With these and other objects in view, which will become apparent from the following description, the invention includes certain novel features of design and combinations of parts the essential elements of which are set forth in the appended claims and a preferred form or embodiment of which is hereinafter described with reference to the drawings which accompany and form a part of this specification.

In the drawings:

Fig. 4 is a left side elevation showing the connection between the novel clutch control mechanism and a group of control keys located on the left-hand side of the machine.

Fig. 5 is a side view of the motor drive mechanism for operating the calculating machine.

Figure 1:
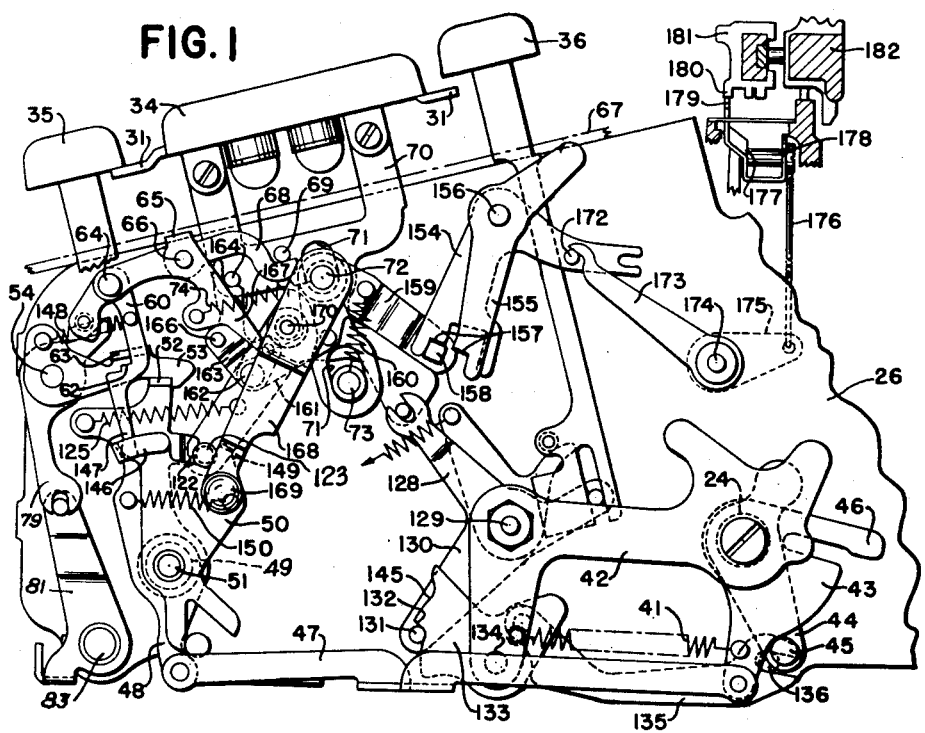
Fig. 1 is a right side elevation of a mechanism embodying the present invention.

In the accompanying drawings, the invention is shown as applied to a calculating machine of a well-known type, the basic structure of which is disclosed in United States Patent No. 1,197,276, issued September 5, 1916, to Halcolm Ellis. The driving motor and the clutch therefor are shown only in a general manner in the present drawings, and reference is made to United States Patent No. 2,142,341, issued January 3, 1939, to Charles H. Arnold, and United States Patent No. 2,243,806, issued May 27, 1941, to Laurence N. Lehman, for a detailed description of this mechanism.

As shown in Fig. 5, the means for operating the present machine comprises an electric motor 9, which is preferably of the start-stop type disclosed in Patent No. 2,142,341, supra, which motor is secured to a clutch housing 10 by means of screws 11. The housing 10 is attached to the under side of a machine base 12 by any suitable form of fastening means. The motor 9 is provided with a shaft 13, on which is mounted a worm 14, which meshes with the teeth of a worm wheel 15 rotatably mounted on a stud 16, which is attached to the housing 10. Attached to the worm wheel 15 is a driving member 17, which is adapted to be engaged with and to drive a driven member 18 whenever a release lever 19 is rocked counter-clockwise about a pivot stud 20 in a manner to be more fully described hereinafter.

Secured to the driven member 18 is a crank arm 21, to which is pivotally connected the lower end of a link 22, the upper end of which is pivotally connected to an operating arm 23, which is fast on a main shaft 24 journaled between left and right side frames 25 and 26 (Figs. 1 and 6). The arm 23 (Fig. 5) bears at its outer end a roll 27, which operates within a cam slot 28 provided in a plate 29, which is secured to the right-hand end of a leading frame shaft 30 journaled between the side frames 25 and 26. Therefore, each time the crank arm 21 makes one revolution, the operating arm 23 will be raised and lowered, thereby causing the shaft 30 to be rocked first counter-clockwise and then clockwise, so as to cause a leading frame bar (not shown herein but adequately illustrated in the above-cited patents) to be moved first toward the rear and then back toward the front of the machine, thereby causing the actuator racks of the machine to be reciprocated back and forth in a well-known manner.

As in previous machines of this type, the clutch may be engaged by the depression of either a main motor bar 34 (Fig. 1), a skip tab motor bar 35, or a vertical feed motor bar 36. The skip tab motor bar 35 and the vertical feed motor bar 36 each overlie a lip 31 provided on either end of the main motor bar 34, so that, whenever either of these two bars is depressed, the main bar will likewise be carried down and thereby cause the motor clutch to be engaged and the machine to be operated. The clutch may also be engaged by any one of a group of motorized control keys located on the left-hand side of machine. As shown in Fig. 4, these keys consist of a balance key 37, a total-3 key 38, a total-4 key 39, and a total-2 key 40. In the present machine, however, unlike the previous machines, the depression of the manipulative members 34 to 40, inclusive, serves to release a clutch control mechanism to the pull of an actuating spring 41 (Figs. 1 and 2), which then operates the mechanism and causes the clutch to be engaged. As shown in Fig. 1, the spring 41 is stretched between a stationary bracket 42 and an arm 43 pivotally mounted on the main shaft 24. Secured to the main shaft adjacent to the arm 43 is a restoring arm 44 bearing a stud 45, which is adapted to engage with a finger 46 formed on the arm 43, as the main shaft is rocked, to thereby retension the spring 41 and prepare the mechanism for the next operation.

Pivotally connected to the arm 43 is the rear end of a link 47, the forward end of which is pivotally connected to the lower end of a release lever 48, which is loosely journaled on the hub 49 of a pawl-disabling arm 50, which is pinned to the right-hand end of an interlock shaft 51. The upper end of the lever 48 is provided with a formed-over ear 52, which is adapted to cooperate with a tooth formed on a latch 53, which is pivoted on a stud 54 secured to the right side frame 26. The latch is adapted to be disengaged from the ear 52 by either one of a pair of release pawls 60 and 61, each of which is provided with a shoulder 62 adapted to cooperate with a formed-over ear 63 provided on the latch 53. Hence, when the pawls 60 and 61 are lifted, the latch 53 will be disengaged from the ear 52 on the lever 48, and the latter member will be released for clockwise movement under the influence of the actuating spring 41, so as to cause the clutch to be engaged in a manner hereinafter to be described.

The pawl 60 (Fig. 1) is adapted to be lifted whenever one of the motor bars 34, 35, or 36 is depressed, this pawl being pivotally connected at 64 to the right-hand arm of a yoke 65, which is pivoted on a stud 66 mounted on a key stem guide bracket 67 secured to the right side frame 26. The left-hand arm of the yoke is provided with a rearwardly extending finger 68, which lies beneath a stud 69 mounted in a stem 70 of the motor bar 34. As shown herein, the stem 70 is provided with slots 71, which engage over studs 72 and 73 secured to the right side frame 26 so as to support the motor bar 34 for vertical sliding movement. A spring 74, stretched between the right arm of the yoke 65 and the stud 72, tends to rock the yoke counter-clockwise about the stud 66, thereby urging the motor bar into its elevated or undepressed position. Thus, when the motor bar is depressed, the yoke 65 will be rocked in a clockwise direction against the urgency of the spring 74, so as to cause the pawl 60 to be lifted and the lever 48 to be released.

In a similar manner, the pawl 61 (Fig. 2) is pivotally connected at 75 to a lever 76, which is pivotally mounted on the stud 66. The lever 76 bears a stud 77, which cooperates with a finger 78 formed on a lever 79, which is pivoted on the stud 54. The lever 79 is provided with a downwardly-extending arm which is slotted at its lower end to receive a stud 80 secured to the right-hand arm 81 of a yoke 82, which is loosely journaled on a shaft 83 extending between the side frames 25 and 26. As shown in Fig. 4, the yoke 82 is provided with a left-hand arm 84 bearing a stud 85, which cooperates with the slotted end of a lever 86 pivoted on a stud 87 secured to the left side frame 25. The upper end of the lever 86 is provided with a bifurcation which engages with a stud 88 secured to the forward end of a control key release bar 89. The bar 89 is supported at its rear end by an arm 90, which is pivotally mounted on a stud 91 secured to the left side frame 25, and at its forward end by a slot engaging a stud 92 mounted in a release key lever 93, which is pivotally mounted on a screw 94 extending into the left side frame.

The bar 89 is urged rearwardly by a spring 97 and is provided with four upstanding lugs 98 associated with each of the keys 37 to 40, inclusive. As shown in Fig. 4, the stem of each of the keys 37 to 40, inclusive, is provided with a latching notch 99, which is adapted to be engaged by a formed-over ear 100 provided on the upper end of a key latch associated with each of these four keys. As shown herein, the balance key 37 is provided with a key latch 101, which is pivotally mounted on a stud 102 secured to the left side frame and urged in a clockwise direction about this stud by means of a spring 103, so as to urge the ear 100 into engagement with the rear edge of the key stem of the balance key. Consequently, when the balance key is depressed, the spring 103 will urge the ear 100 into engagement with the notch 99 to thereby latch the key in its depressed position and at the same time move the bar 89 forwardly against the urgency of the spring 97 by reason of the engagement of the ear 100 with the lug 98. Likewise, the total-3 key 38 has associated therewith a key latch 104, which is pivotally mounted on a screw 105 secured to the left side frame, the latch being urged clockwise about the screw by means of a spring 106, so as to cause the ear 100 to engage with the notch 99 in the key 38 when the key is depressed, and also to move the bar 89 forwardly in the machine. The total-4 key 39 has associated therewith a key latch 107, pivotally mounted on a stud 108 secured to the left side frame, which latch is urged in a clockwise direction by means of a spring 109 acting through an intermediary consisting of a lever 110 pivotally mounted on a frame screw 111 and connected with the latch 107 by means of a link 112. Similarly, the total-2 key 40 is provided with a key latch 113 pivotally mounted on the screw 111 and urged in a clockwise direction by means of a spring 114, so as to latch down this key when the latter is depressed and cause the bar 89 to be moved forward.

In order to cause the control keys to be released at the end of each machine operation, a key release pawl 115 is pivotally mounted on the rear end of the bar 89, this pawl being operated to move the bar rearwardly at the end of each cycle so as to release the key latches from the notches 99 and thereby permit the keys to be restored by means of compression springs 116 (only one shown herein) coiled around the lower end of each key stem. The mechanism for operating the pawl 115 at the end of each cycle is well known in the art and is completely shown in Fig. 58 of Patent No. 1,197,276, hereinbefore referred to, wherein the pawl L67, which corresponds to the pawl 115 shown herein, is operated near the end of each cycle by a stud 13D on the plate D50. The bar 89 may also be moved rearwardly by depression of a release key 117, which causes a stud 118 to engage with a cam surface 119 formed on the lever 93 and rock said lever 93 clockwise about the screw 94. The stud 92 is thereby caused to engage with the rear end of the slot formed in the bar 89 and thus move the bar toward the rear of the machine so as to release any depressed control key.

Figure 2:
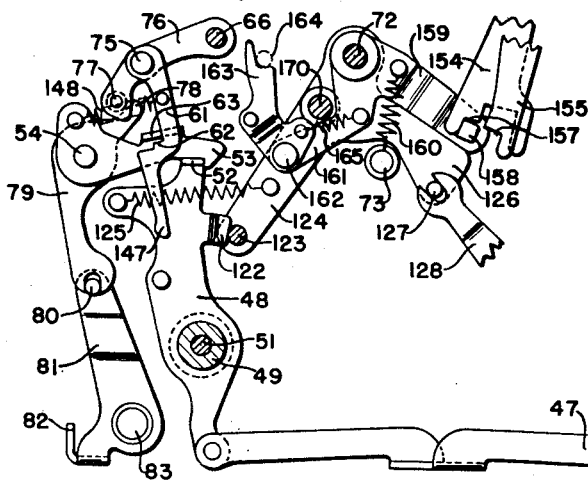
Fig. 2 is a view showing a portion of the mechanism shown in Fig. 1, with certain parts removed in order to more clearly illustrate the mechanism involved.

It will be noted from the preceding description that, whenever any of the four control keys 37 to 40, inclusive, is depressed, the bar 89 will be moved forwardly so as to rock the yoke 82 clockwise, as viewed in Figs. 1 and 2, thereby rocking the lever 76 clockwise and causing the pawl 61 to be lifted so as to release the latch 53 from the lever 48 and cause the clutch to be engaged.

When the lever 48 is rocked clockwise by the spring 41, engagement of the clutch is effected by means of a lug 122 provided on the lever, which lug is urged into engagement with a stud 123, provided on a lever 124 pivotally mounted on the stud 72, by means of a spring 125 stretched between the levers 48 and 124. The lever 124 is provided with a rearwardly-extending arm 126, on which is mounted a stud 127, which engages with a bifurcation provided in one arm of a three-armed lever 128 pivotally mounted on a stud 129 extending between the right side frame 26 and the bracket 42. The lever 128 is provided with a downwardly-extending arm 130 bearing a stud 131, which lies in front of a shoulder 132 formed on a clutch release pawl 133 pivotally mounted on a stud 134 extending between the right side frame and the bracket 42. Pivotally secured to the pawl 133 is the forward end of a pitman 135, the rear end of which is provided with a slot which engages with a stud 136 secured in the right side frame 26. The pitman 135 (Fig. 5) carries a stud 137, which is engaged by the forked upper end of an arm 138 formed on a lever 139 loosely journaled on the pivot stud 20. This lever is connected by a pin 140 with the release lever 19, thereby causing these levers to move together as a unit. The levers 19 and 139 are urged in a counter-clockwise direction, as viewed in Fig. 5, by means of a spring 141 attached to the pin 140, thereby urging the pawl 133 in a counter-clockwise direction so as to hold the shoulder 132 in contact with the stud 131. However, when the latch 53 (Figs. 1 and 2) is elevated so as to release the lever 48 to the action of the spring 41, the stud 131 will be moved upwardly out of engagement with the shoulder 132, thereby permitting the spring 141 to rotate the levers 19 and 139 counter-clockwise. The rear end of the lever 19 will then move up out of engagement with the shoulder formed on the driven member 18 so as to release the latter and cause the clutch to be engaged. This will result in operation of the main shaft 24 and the leading frame shaft 30 by the electric motor 9.

The lever 139 is provided with a downwardly-extending arm 142, on the lower end of which is provided a roll 143, which is adapted to be engaged by a nose 144 formed on the crank arm 21 as the latter nears the completion of one revolution of movement. Thus, at the end of each machine cycle, the levers 19 and 139 will be rocked clockwise against the pull of the spring 141, so as to restore the pawl 133 to its initial position, where it will be retained by the stud 131 engaging beneath the shoulder 132.

It is to be noted that the stud 45, carried by the arm 44 (Figs. 1 and 2) on the main shaft 24, will engage with the finger 46 and restore the release lever 48 at the middle of the machine cycle, thereby causing the spring 125 to be stretched and the stud 131 to be resiliently pressed against the surface 145 on the clutch release pawl 133. Hence, when the pawl 133 is restored by the engagement of the nose 144 with the roll 143 near the end of the cycle, the stud 131 will snap behind the shoulder 132 and hold said pawl in its home position against the urgency of the spring 141.

In order to prevent repeated cycling of the machine in the event that the motor bar is held depressed or that one of the control keys is held down after the first cycle has been completed, a non-repeat mechanism has been provided so as to enable the latch 53 to engage with the ear 52 on the lever 48 even though the operator of the machine holds one of the manipulative elements depressed. The means for accomplishing this result consists of a U-shaped extension 146, (Fig. 1) provided on the pawl-disabling arm 50, which is adapted to cooperate with tails 147 provided on the pawls 60 and 61.

When the lever 48 is released to the influence of the spring 41, the pawl-disabling arm 50 will be rocked in a clockwise direction by means of the stud 123, which engages with a nose 149 provided on the arm 50. This will cause the lower ends of the pawls 60 and 61 to be moved toward the rear of the machine against the force of springs 148 stretched between the pawls and a stud mounted in the latch 53. Thus the shoulders 62 will be disengaged from the ear 63 and thereby permit the latch to reengage with the ear 52 even though the control keys or the motor bar be held depressed.

The nose 149 is urged into engagement with the stud 123 by means of a spring 150 stretched between the lever 48 and the arm 50, thereby causing the arm 50 to be restored at the same time that the lever 124 is restored (near the end of the machine cycle). When the arm 50 is thus restored, the tails 147 will be released by the extension 146 and the pawls 60 and 61 will then be free to return to their effective positions, as shown in Figs. 1 and 2, under the influence of their respective springs 148.

In order to prevent a machine cycle from being initiated when the traveling paper carriage is out of columnar position or "off stop," or when an amount key is in a partially-depressed position or when some other condition obtains which renders it undesirable to permit a machine operation to take place, a plurality of locking arms, such as arms 154 and 155 (Figs. 1, 2, and 3), are pivotally mounted on a stud 156 secured in the right side frame, each arm being provided with a shoulder 157, which is adapted to lie over a square stud 158 carried by an arm 159, which is pivotally mounted on the stud 72. This arm has a form provided therein so that its lower edge will lie over and engage with the upper edge of the arm 126. The arm 159 is urged in a clockwise direction about the stud 72 by means of a spring 160 stretched between the arm and the stud 73.

The arm 159 has integral therewith a forwardly-extending arm 161, which bears a stud 162, on which is pivotally mounted a pawl 163. This pawl is provided at its upper end with a notch which is urged into engagement with a stud 164 secured to the stem 70 of the motor bar 34 by a spring 165. The pawl 163 also bears a stud 166, which is adapted to be engaged by a finger 167 formed on the right-hand arm of the yoke 65. Thus, when the yoke is rocked clockwise by depression of the motor bar, the pawl will be rocked counter-clockwise as the motor bar is depressed until it is moved out from beneath the stud 164 just before the motor bar reaches its lowermost position. This will release the arm 159 to the action of the spring 160 and permit the arm to be restored to its initial position, as shown in Figs. 1 and 2, even though the motor bar be held depressed. Accordingly, any of the locking arms may move into position to block the square stud 158 and prevent engagement of the clutch so long as the condition which caused the blocking arm to be moved over the square stud prevails.

If it were not for this release feature being provided for the arm 159, it would be possible for the operator to hold the motor bar depressed until after the end of the machine cycle and then, with the motor bar depressed so as to render the locking arms ineffective, operate one of the control keys 37 to 40, inclusive, so as to cause the pawl 61 to lift the latch 53 and cause a machine cycle to be initiated. However, with the automatic release mechanism for the arm 159 hereinbefore described, it is impossible for the operator to thus engage the clutch, since any locking arm which may be rendered effective will block the arm 159 and prevent the lever 124 from being rotated under the influence of the spring 41 when the latch 53 is released by the pawl 61.

In case the pawl 61 is lifted by depression of one of the control keys 37 to 40, inclusive, while a locking arm is effective to block the square stud 158, the lever 48 will escape far enough to the right (Figs. 1 and 2) to prevent the ear 52 from being reengaged by the hook-shaped end of the latch 53 when the latter is released, as, for instance, by depression of the release key 117 to release any depressed control key. It is to be noted that the pawl 60 cannot thus be operated to lift the latch 53 when a locking arm is in effective position, since in this case depression of the motor bars is positively prevented by reason of the linkage consisting of stud 164, pawl 163, arm 161, arm 159, and square stud 158. When the lever 48 is thus released to the pull of the spring 41, it causes the square stud 58 to be pressed against the shoulder 157 of the effective locking arm with sufficient force to create a bind thereon and hence prevent the locking arm from being moved away from the stud 158 even though the condition which caused the locking arm to be rendered effective has been removed. Under these circumstances, the machine is rendered inoperative; that is, a machine cycle cannot be initiated by manipulation of the control keys or motor bars. In order to enable the operator to relieve the pressure on the square stud and thereby eliminate the bind which causes the difficulty, a restoring lever 168 (Fig. 1) is provided, this lever having a handle 169, which projects through the cabinet of the machine on its right-hand side. The lever 168 is secured to the lever 124 by means of a pin 170, which secures the two levers to one another for unitary operation. Thus, the operator of the machine may, by pulling up on the handle 169, rock the release lever 48 counter-clockwise to thereby reengage the ear 52 with the latch 53. The locking arm will thereby be released, and the machine will be restored to its initial condition. Hence, as soon as the locking arm is moved from above the square stud 158, the machine may be cycled in the usual way by depression of one of the control keys or one of the motor bars.

Figure 3:
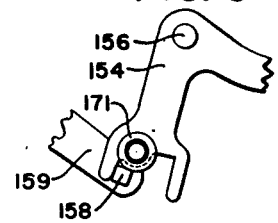
Fig. 3 is a fragmentary view showing a modification of the structure shown in Figs. 1 and 2.

In some cases, it may be desirable to have the machine operate when the condition which necessitates the blocking of machine operation has been removed, and for this purpose the construction shown in Fig. 3 may be employed. As shown therein, a roll 171 is provided on the locking arm 154 in the position normally occupied by the shoulder 157. Hence, the roll will engage with the square stud 158, and, even though the stud be pressed against the shoulder 157 with considerable force, there can be no binding action which will prevent the locking arm from moving away from the square stud. This feature may be found desirable, for example, in those types of operations where it is advantageous to permit a total key to be depressed while the traveling paper carriage is moving between columnar positions. In this case, the locking arm 154 would ordinarily be moved into effective position with the roll 171 located above the square stud 158 during the time that the traveling carriage is moving between columnar positions, the means for accomplishing this result being shown and described in the aforementioned Lehman patent and reproduced in Fig. 1 of the present drawings. As shown in this figure, the rearward extension of the arm 154 is provided with a stud 172, which cooperates with the end of an arm 173 secured to a control shaft 174 journaled in the side frames 25 and 26. Also secured to this shaft is a crank 175, to which is connected the lower end of a link 176, the upper end of which is connected to the left-hand end of a hanging bar lever 177 pivoted near its center on a stud 178 secured to the machine frame. The hanging bar lever 177 is provided on its right-hand end with a cam nose 179, which is adapted to be engaged by a lug 180 located on a carriage stop 181, which is mounted on the traveling paper carriage 182.

When the carriage moves into a preselected columnar position, the lug 180 depresses the right-hand end of the hanging bar lever, thus lifting the link 176 and rocking the control shaft 174 counter-clockwise. This will result in the locking arm 154 being rocked clockwise about the stud 156 to thereby remove the roll 171 from above the square stud 158. If, during the time that the carriage is traveling between columnar positions, one of the total keys 37 to 40, inclusive, is depressed, the latch 53 will be released and the lever 124 will be urged counter-clockwise by the spring 41 to thereby press the square stud 158 up against the roll 171. Then, as soon as the traveling carriage comes to rest in a column where a lug 180 is present on the carriage stop 181, the locking arm 154 will be rotated in a clockwise direction, thereby releasing the square stud 158 and permitting the clutch to be engaged and the machine to be cycled.

Means is also provided for preventing any one of the control keys 37 to 40, inclusive, from being depressed once the clutch has been engaged. As shown in Fig. 4, each of the keys is provided with a stud 185, which is adapted to engage with a pendant 186, so as to prevent more than one of the keys from being depressed at a time. Also pivotally mounted on a stud 187, secured in the left side frame 25, is an interlocking arm 188, which is urged clockwise by means of a spring 189. This arm is provided with a finger 190, which lies beneath the stud 185 on the balance key 37, the finger also pressing against the rightmost pendant, as viewed in Fig. 4, so as to rock all of the pendants in a clockwise direction. The arm 188 is also provided with a formed-over ear 191, which is adapted to cooperate with a blocking finger 192 formed on a pelican cam 193 secured to the interlock shaft 51 just inside the left side frame 25. Hence, whenever the pawl-disabling arm 50 is rocked clockwise by the spring 41, the shaft 51 will likewise be rocked clockwise, as viewed in Fig. 1, so as to cause the finger 192 on the pelican cam to be moved beneath the ear 191, thereby preventing movement of the interlocking arm 188 and of each of the pendants 186. Thus all of the control keys will be effectively blocked against operation once the arm 50 has been rocked by the spring 41.

The pelican cam 193 (Fig. 4) is also provided with a blocking face 194, which is adapted to move beneath a rearwardly-extending finger 195 secured to the release key 117, so as to prevent depression of the release key after the pawl-disabling arm 50 has been rocked clockwise, as viewed in Fig. 1. Thus the release key cannot be depressed during a cycle of machine operation to thereby release one of the control keys prematurely and so cause a misoperation of the machine.

From the foregoing description of the mechanism shown in the accompanying drawings, it will be appreciated that the control keys and the motor bars have only the task of raising the pawls 60 and 61 so as to lift the latch 53, after which the spring 41 rocks the lever 48 and the remainder of the clutch control linkage to thereby cause engagement of the clutch. Thus, only a very light pressure need be applied to the control keys or the motor bars in order to initiate an operation of the machine.

Although the structure shown and described herein illustrates a very satisfactory and desirable form or embodiment of the invention, it is understood, of course, that modifications might be made in the mechanism diclosed herein without departing from the spirit or principle of the invention defined by the following claims.

What is claimed is:

1. In a machine of the character described, having a main operating mechanism, an electric motor to drive the main operating mechanism, and a clutch to selectively connect said motor with said main operating mechanism, the combination of means to control the engaging and disengaging of the clutch; yieldable means to move the controlling means to clutch-engaging position; means normally effective to hold the controlling means in clutch-disengaging position against the action of the yieldable means; power-operated means movable to effective position to disable the holding means to engage the clutch; means to retain the power-operated means in ineffective position; manipulative means to disable the retaining means; means to restore the power-operated means to ineffective position; means to restore the controlling means into engagement with its holding means; and means operable by the power-operated means when it moves to effective position to disable the manipulative means to insure that the retaining means will be effective to retain said power-operated means in restored position.

2. In a machine of the class described, the combination of power means for giving the machine a cycle of operation; means for connecting the power means to the machine; means, including a release lever, for rendering the connecting means effective; yieldable means for operating said release lever; a latch for restraining said lever against operation by said yieldable means; manually operable means for disengaging said latch from said lever to thereby enable said yieldable means to operate said release lever and cause said machine to be given a cycle of operation; means operable on each cycle of operation of the machine for restoring said release lever to its initial position; and means operated by said release lever for disabling said manually operable means so as to enable said latch to reengage with said lever when the latter is restored to its initial position even though said manually operable means is held operated.

3. In a machine of the character described, having a main operating mechanism, an electric motor to drive the main operating mechanism, and a clutch to connect the motor with the main operating mechanism, the combination of control means normally effective to maintain the clutch disengaged, but releasable to effect engagement of said clutch; a release lever to actuate the control means; power means to move the release lever from an ineffective position to an effective position to release the control means to initiate an operation of the machine; a latch to engage and retain the release lever in ineffective position against the action of the power means; a lifter to disengage the latch from the release lever; manually operable means to lift the lifter; and means operable by the release lever upon disengagement of the latch to disable the lifter to permit the latch to reengage said release lever when said release lever is restored to normal position even though the manually operable means is retained in operated position.

4. In a machine of the class described having a main operating mechanism capable of being given cycles of operation, power means for driving said mechanism through said cycles of operation, and a clutch device for connecting said power means to said mechanism so as to cause said mechanism to be given a cycle of operation, the combination of means, including a release lever, for rendering said clutch device effective to connect said power means to said main operating mechanism; a spring for operating said release lever; a latch for restraining said release lever against operation by said spring; a member for disabling said latch so as to enable the release lever to be operated by said spring; means for restoring said release lever to its initial position during the first half of each machine cycle; and means comprising an arm flexibly connected with said release lever for disabling said member when said release lever is operated and for retaining said member disabled until near the end of the machine cycle.

5. In a machine of the class described, the combination of means for giving the machine cycles of operation; means for initiating operation of said cycling means including a release lever; power means for actuating said release lever; a latch for restraining said lever against actuation by said power means; manipulative means for disabling said latch and releasing said lever to the influence of said power means; selectively operable means for blocking movement of said release lever under the influence of said power means; and means for manually restoring said release lever to its original latched position after it has been released by said manipulative means and blocked by said selectively operable means.

6. In a machine of the class described, the combination of means for giving the machine cycles of operation; means for initiating operation of said cycling means; means, including a release lever, for rendering said initiating means effective; power means for operating said release lever; a latch for restraining said release lever against operation by said power means; a pawl for disabling said latch so as to enable the latter to be operated by said power means; manipulative means for operating said pawl; a pawl disabling arm flexibly connected with said release lever and operable thereby to move said pawl out of engagement with said latch when the lever is operated; means for restoring said release lever to its initial position during the first half of each machine cycle; and means for retaining said pawl disabling arm in its operated position until near the end of the machine cycle so as to maintain said pawl disengaged from said latch for the balance of each machine cycle.

7. In a machine of the class described, the combination of means for giving the machine cycles of operation; means movable from an inactive position to an active position for initiating operation of said cycling means; power means for moving said initiating means from its inactive position to its active position so as to cause operation of said cycling means; means for restraining said initiating means against movement by said power means; manipulative means for disabling said restraining means so as to enable said power means to move said initiating means to its active position; normally ineffective means for blocking said initiating means against movement by said power means; means for rendering said blocking means effective; a device operable by said manipulative means for cooperating with said blocking means so as to prevent movement of said manipulative means when said blocking means is rendered effective; and means movable with said manipulative means and cooperating with said device when said blocking means is ineffective for causing said device to be released from said manipulative means when the latter means has been fully manipulated.

8. In a machine of the class described, the combination of means for giving the machine cycles of operation; means movable from an inactive position to an active position for initiating operation of said cycling means; power means for moving said initiating means from its inactive position to its active position so as to cause operation of said cycling means; means for restraining said initiating means against movement by said power means; manipulative means for disabling said restraining means so as to enable said power means to move said initiating means to its active position; normally ineffective means for blocking said initiating means against movement by said power means; means for rendering said blocking means effective; a device operable by said initiating means and also by said manipulative means for cooperating with said blocking means so as to prevent movement of said initiating means when said blocking means is rendered effective; and means for causing said device to be released from said manipulative means when the latter means is fully manipulated.

9. In a machine of the class described, the combination of means for giving the machine cycles of operation; means movable from an inactive position to an active position for initiating operation of said cycling means; power means for moving said initiating means from its inactive position to its active position; means operable during each cycle of operation for restoring said initiating means to its inactive position; means for restraining said initiating means aganst movement by said power means; a plurality of selectively operable means for independently disabling said restraining means so as to enable said power means to move said initiating means to its active position; one or more blocking members; an intermediate member movable by one of said disabling means and also by said initiating means from a normal position to a moved position, said member, when in its normal position, being capable of being blocked by said blocking member so as to prevent said initiating means from being moved to active position; means for resiliently urging said intermediate member into its normal position; and means for causing said intermediate member to be released from said one disabling means after said member has reached its moved position to thereby enable said member to be returned by said urging means to normal position when said initiating means is restored, where it may be blocked by any one of said blocking members and so prevent said initiating means from being moved to active position when another of said disabling means is operated.

10. In a machine of the class described having means for giving the machine cycles of operation and means for initiating operation of said cycling means, the combination of means, including a release lever, for rendering said initiating means effective; power means for operating said release lever; a latch for restraining said release lever against operation by said power means; a pair of pawls for disabling said latch so as to enable the release lever to be operated by said power means; manipulative means for operating each of said pawls; means for restoring said release lever near the middle of each cycle of the machine; and means for disabling said pawls when said release lever is operated and for maintaining said pawls disabled until near the end of the machine cycle, so as to enable said latch to reengage with said lever when the latter is restored even though one of said pawls be held operated, said disabling means operating to cause the other of said pawls to become effective to release said latch upon operation of its associated manipulative means at the conclusion of the machine cycle.

11. In a machine of the class described, having a main operating mechanism, an electric motor to drive the main operating mechanism, and a clutch to connect the motor and the main operating mechanism, the combination of movable means to control the clutch; yieldable means to move the control means to ineffective position to render the clutch effective; means to restore the control means to effective position; means to hold the control means in effective position against the action of the yieldable means to render the clutch ineffective; an actuator for the holding means; power means to move the actuator from normal position to effective position to disable the holding means; means to restore the actuator to normal position; yieldable means between the actuator and the holding means and effective when the actuator is in normal position, to enable said holding means; means normally effective to retain the actuator in normal position against the action of the power means; manually operable means to move the retaining means to ineffective position; means normally effective to connect the manually operable means with the retaining means; and means operable in unison with the actuator upon its movement to effective position to disconnect the connecting means from the retaining means to render said retaining means effective to retain said actuator in restored position even though said manually operable means is retained operated.

RAYMOND A. CHRISTIAN.
WILLIAM L. PADEN.

REFERENCES CITED

The following references are of record in the file of this patent:

UNITED STATES PATENTS

| Number | Name | Date |
|---|---|---|
| 2,371,083 | Walker et al. | Mar. 6, 1945 |